Oct. 9, 1951 N. ROCHESTER 2,570,716

SIGNAL TRANSMISSION NETWORK

Filed Nov. 27, 1948 3 Sheets-Sheet 1

INVENTOR.
Nathaniel Rochester
BY A. B. Richardson
Attorney

Oct. 9, 1951 N. ROCHESTER 2,570,716

SIGNAL TRANSMISSION NETWORK

Filed Nov. 27, 1948 3 Sheets-Sheet 2

| | | | | | | | | | |
|---|---|---|---|---|---|---|---|---|---|
| LINE A | + | − | + | − | + | − | + | − | + |
| LINE B | − | + | − | + | − | + | − | + | − |
| LINE C | + | + | − | − | + | + | − | − | + |
| LINE D | − | − | + | + | − | − | + | + | − |
| LINE E | + | + | + | + | − | − | − | − | + |
| LINE F | − | − | − | − | + | + | + | + | − |
| CHANNEL | 1 | 2 | 3 | 4 | 5 | 6 | 7 | 8 | 1 |

INVENTOR.
Nathaniel Rochester
BY [signature]
Attorney

SIGNAL TRANSMISSION NETWORK

Filed Nov. 27, 1948 3 Sheets-Sheet 3

INVENTOR.
Nathaniel Rochester
BY [signature]
Attorney

Patented Oct. 9, 1951

2,570,716

UNITED STATES PATENT OFFICE 2,570,716

SIGNAL TRANSMISSION NETWORK

Nathaniel Rochester, Milton, Mass., assignor to Sylvania Electric Products Inc., a corporation of Massachusetts Application November 27, 1948, Serial No. 62,356

13 Claims. (Cl. 177—353)

The present invention relates to passive switching networks, especially of the type using diode rectifiers. Networks or matrices are known wherein a certain number $n$ of pairs of control leads are interconnected to a larger number of individual channels. Upon energization of one lead of each pair in relation to the other, all but one of the individual channels can be disabled, thus effecting a selection of a single channel. The paired leads are energized in various combinations to select the several channels, each channel being individually selected by a related combination. The matrix as a circuit element involves no moving contacts, and is practically instantaneous in its response to changed conditions of energization. Various forms of matrices are disclosed and claimed in my Patent No. 2,476,066, issued July 12, 1949.

Various forms of matrices are known which rely on diodes for operation in the manner described. The paired leads function simply as control leads. Signals separately coupled to the several individual channels are transmitted through the selected channel only, being blocked in all the other channels.

The present invention greatly extends the usefulness of the foregoing types of matrices, enabling use of the matrix not merely as a passive, high-speed switch, but additionally as a signal-transmission network. This basic enlargement of matrix usefulness includes two principal categories, in which the matrix serves as a "distributor" and as a "collector." In the distributor a signal is routed through the matrix from a single signal-input lead to a selected output channel under control of the paired control leads. In the collector, signals originating in the various individual channels are selected under control of the paired leads, and routed to a common output channel.

The distributor is variously applicable, as in telemetering systems and in computing organizations. In telemetering systems, a sequence of pulses each representing a different measurement can be relayed through a radio link to a receiver, and the signals in a common receiver channel, representing the several measurements, can be routed through the matrix successively to several channels in predetermined order under control of the paired leads. In the case of the distributor as applied to a computing organization, the several individual channels may contain registers, and impulses from a common line or bus can be routed through the matrix to a selected register under control of the paired control leads.

The collector can be used at the transmitter end of the telemetering system described to sample the several measurement channels successively under control of the paired leads and route the various measurements into a common output channel, there to modulate the telemeter-transmitter. Similarly, the distributor can serve in computing organizations for relaying the values set up in a selected one of a large number of registers, the registered data being transmitted to a common bus through the matrix.

The invention and its several novel features will be more fully appreciated from the following detailed description of various specific but illustrative embodiments. Other applications and detailed modifications and substitutions will occur to those skilled in the art. In the accompanying drawings.

Figure 1:
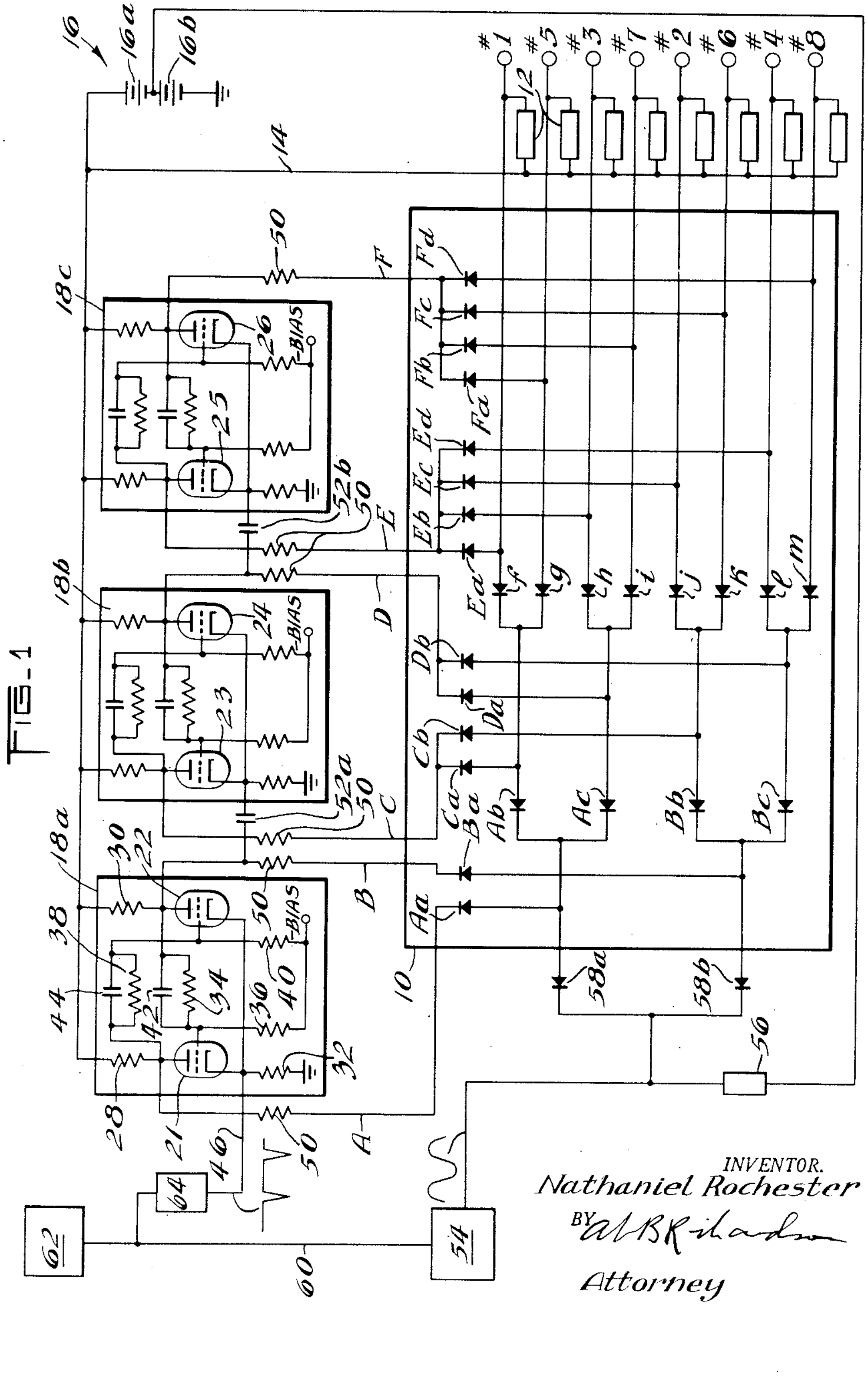
Fig. 1 is the wiring diagram of one embodiment of the invention, wherein the matrix serves as a distributor interconnecting a common channel to various selected individual channels.

In Fig. 1, a matrix 10 is shown wherein paired leads A and B, C and D, and E and F can be energized appropriately to select one unit 12 of the several individual channels #1 to #8 inclusive. Matrix 10 includes multiple diodes which advantageously are point-contact germanium-crystal rectifiers of compact, low-capacitance characteristics. Channels #1 to #8 have a common return line 14 to the positive terminal of a direct-current supply 16 that is divided into two sections 16*a* and 16*b*. The crystals are all so polarized as to present a minimum of resistance to negative potentials developed at paired leads A—B, C—D, and E—F in relation to positive line 14. In like sense, negative potential developed on the opposite side of the crystals connected to leads A to F would tend to bias those crystals to the high-resistance part of their characteristic.

Matrix 10 is of the known "pyramid" form. Each channel #1 to #8 has one crystal *f*, *g*, *h*, *i*, *j*, *k*, *l* and *m* with four crystals A*b*, A*c*, B*b*, and B*c* connected to the 8 crystals *f* to *m* in pairs. Crystals A*a* and B*a* are connected to pairs of crystals in the group of four crystals. There are thus two crystals connected to leads A and B, which are connected to a group of four crystals which in turn are connected to a group of eight crystals, in pyramidal array. Should lead A be made negative, it is readily apparent that four of the channels #1 to #8 would have negative bias developed across their units 12 through diodes biased into their conductive region. The other four channels would be similarly negatively biased should lead B, instead, be charged negatively.

Figure 3:
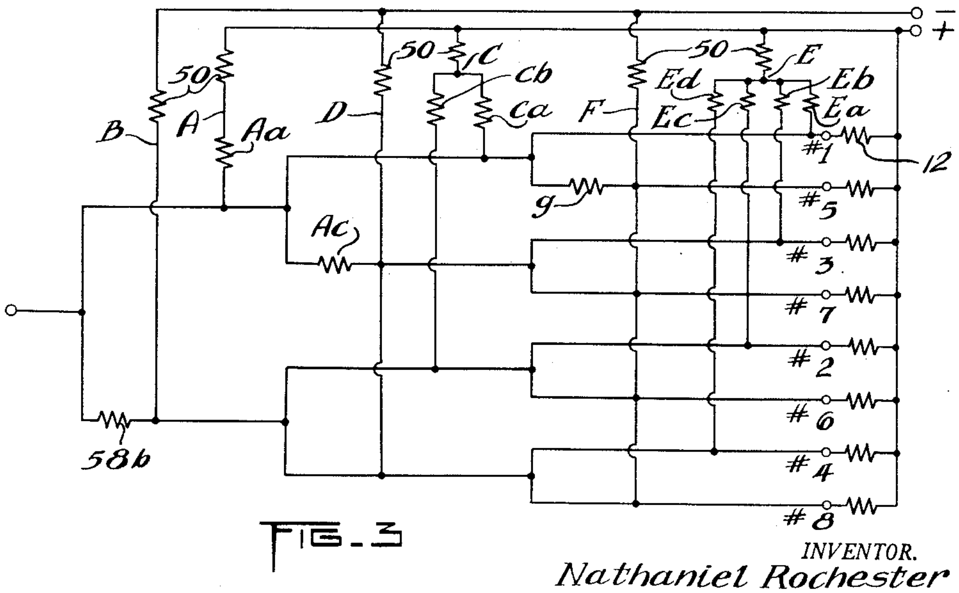
Fig. 3 is a simplified diagram representing the matrix of Fig. 1 in one condition of its operation.

Leads C and D are similarly coupled to channels #1 to #8 in groups of four each. Lead C is connected to two of the four channels of crystal A*a* through crystal C*a*, and to two of the four channels of lead B through crystal C*b*. Lead D is connected through crystals D*a* and D*b* to the four remaining channels reached by leads A and B through crystals A*c* and B*c*. Leads E and F are likewise connected through E*a*, E*b*, E*c* and E*d*, to one group of four channels and through crystals F*a*, F*b*, F*c* and F*d* to another group of four channels of the eight channels #1 to #8. The groups of four channels to which leads E and F are connected are different from the groups of four channels for leads A and B and for C and D. If one lead of each pair of leads A—B, C—D, and E—F is driven negative, it will be seen that all of the channels #1 to #8 except one will be driven negative. When leads A, C and E are driven negative many of the crystals in the matrix are biased in their low-resistance direction, and this bias reacts on the remaining crystals, tending to bias them in their high-resistance or back-resistance direction, as is indicated in Fig. 3. In that figure the crystals biased in their forward-conducting direction are omitted since they may be considered comparable to wiring, whereas crystals exposed to negative potential at their sides nearer channels #1 to #8 are represented as resistors having the same reference characters as the corresponding rectifiers in Fig. 1. Thus, negative bias on lead D has the effect of biasing crystal A*c* in its back-resistance direction, and similarly negative potential on lead F biases crystal *g* in the back-resistance direction. Negative potential on lead B drives crystal C*b* to its high-resistance region, and crystals E*a*, E*b* and E*c* are biased in their high-resistance direction. Crystals C*a* and E*d* are biased to their high back-resistance region by the signal-transmission circuit to be described. From inspection it will be apparent that negative potential is directly applied (through crystals in their forward-conducting direction) to the lower four channels by lead B, and otherwise; to channels #3 and #7 by lead D; and to channel #5 by lead F; thus leaving channel #1 free of directly applied negative potential. Unit 12 in channel #1 passes only the leakage current through crystals E*a*, *g*, C*a* and A*a* that are biased into their high back-resistance region.

Figure 2:
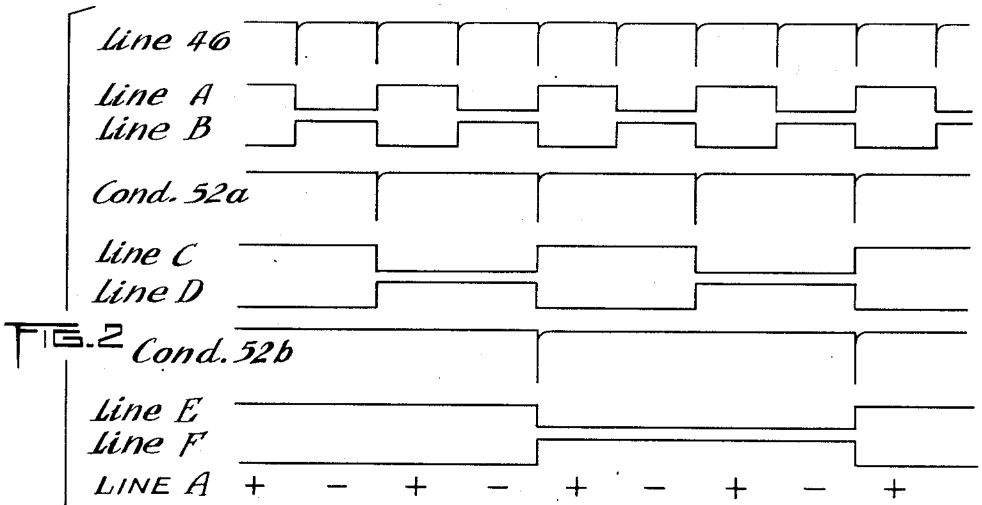
Fig. 2 is a diagram illustrating the manner of energization of the paired leads and their effect in channel selection, the combinations illustrated being established in regular sequence by the circuit of Fig. 1.

The lower portion of Fig. 2 shows the various combinations of potentials to which the six lines A to F are to be energized for selection of the several channels #1 to #8. The positive and negative potentials are relative, positive being as close as practicable to the potential of line 14. It will be noted that the combination required for selection of channel #1 is shown twice in Fig. 2, the several combinations being set up by the additional circuitry of Fig. 1 in regular sequence by a sucession of pulses. That circuitry which energizes leads A to F inclusive illustrates by what means the high-speed characteristic of the passive crystal matrix of inertia-free performance can be utilized. Many other arrangements for effecting the indicated energization of leads will occur to those skilled in the art to meet the requirements of various applications.

In Fig. 1 an electronic unit 18*a* is shown for driving one lead or the other of the pair of leads A and B negative, while maintaining the remaining lead as near the positive potential of lead 14 as possible. Units 18*b* and 18*c* are duplicates of unit 18*a* in construction and function. The several units include two triode vacuum-tubes each, six tubes 21 to 26 inclusive being utilized. Tubes 21 and 22 have separate plate resistors 28 and 30, and have a common cathode resistor 32. The grid or control electrode of tube 21 is energized by a voltage divider comprising resistor 34 that is connected to the plate of tube 22, and resistor 36 that is returned to a negative bias point. The grid of tube 22 is similarly energized by a voltage divider comprising resistor 38, connected to the plate of tube 21, and a second resistor 40 returned to the negative bias point. Shunting resistors 34 and 38 are cross-coupling condensers 42 and 44, respectively.

Unit 18*a* will be recognized as a known form of flip-flop circuit which has two stable operative conditions and which is changed from one to the other and back by a succession of control pulses. In the illustration a succession of pulses (whether at regular time intervals or at random) are applied through lead 46 to the cathodes of tubes 21 and 22, momentarily driving the cathodes more negative than in their stable condition of operation. Immediately prior to the pulse it may be assumed that one of the tubes is conductive, as tube 22, while the other, as tube 21, is biased to cut-off.

The current drawn by tube 22 maintains the cathode of tube 21 well above ground potential because of the drop in common resistor 32; and the current through tube 22 also produces a voltage drop in resistor 30 that lowers the grid voltage of tube 21. When a negative pulse on input wire 46 drives both cathodes negative, the relative potentials of the grid and cathode of tube 21 are such as to allow that tube to commence conducting abruptly. A voltage drop appears across resistor 28 which is transmitted as a negative pulse through cross-coupling condenser 44 to the grid of tube 22, decreasing the plate current of that tube. The decreasing voltage drop across resistor 30 is transmitted through condenser 42 as a positive pulse on the grid of tube 21. The total effect is to drive tube 22 into the cut-off condition and tube 21 into the stable conductive condition.

Leads A and B are coupled, through isolating resistors 50, to the respective plates of tubes 21 and 22. The resistance of units 12 should be lower than the back-resistance of the crystals, but higher than that of resistors 50. At the time that tube 21, for example, is in its conductive state, there is a voltage drop on resistor 28 that drives lead A negative relative to line 14, and at this time, there is no significant plate current drawn by tube 22 and hence no noteworthy voltage drop in resistor 30 between lead B and the positive line 14. The flip-flop unit is thus seen as effective to maintain one lead of the pair A and B negative while allowing the other to reach, very nearly, the potential of the positive line 14. Flip-flops 18b and 18c function similarly to maintain one lead of their respective pairs negative while allowing the other to reach very nearly the positive potential of line 14.

Units 18a and 18b are coupled by a condenser 52a between the plate of tube 22 and the cathodes of tubes 23 and 24, a negative pulse being transmitted to unit 18b when tube 22 becomes conductive and its lead B is driven negative. This occurs once for each two negative pulses applied to lead 46. Units 18b and 18c are similarly interconnected so that, for each two negative pulses transmitted through condenser 52a, there will be one negative pulse transmitted through condenser 52b. The foregoing sequence of operations is shown diagrammatically at the upper part of Fig. 2. The sequence of negative pulses on line 46 is shown, together with the changed states of lines A and B, the resulting pulses transmitted through condenser 52a with the consequent changed states of lines C and D, and finally the sequence of pulses transmitted through condenser 52b with the changed states of lines E and F. The states of lines A to F are illustrated at the top of Fig. 2 by higher and lower levels along the time axis, whereas the relative potentials of those same lines is illustrated at the bottom of Fig. 2 by a pattern of plus and minus signs. Channels #1 to #8 are thus selected in succession, the changes from each channel to the next occurring simultaneously with each pulse in line 46. Were the several units 18 not coupled together, there could be an arbitrary selection of a desired channel, as may be required in certain applications.

In accordance with the present invention, a signal of any given wave-form can be transmitted through a matrix 10 to the selected channel 12, the wave-form being essentially preserved. To illustrate this operation, a source 54 of voltage is shown for impressing a sine-wave across impedance 56 that has its return to a tap in direct-current supply 16. The amplitude of the sine-wave voltage is restricted to the difference between the voltages of any pair of leads, as between the voltages of leads A and B. The mean or bias potential of power-supply section 16a is desirably half that voltage-difference. The sine-wave is transmitted to matrix 10 through a pair of diodes 58a and 58b each of which transmits the signal (under appropriate bias conditions within the matrix) to a respective group of four channels. In the event that channel #1 is selected, line B is negative, and diode 58b is biased into its high-resistance region, as is represented in Fig. 3. The sine-wave is transmitted to channel #1 through diodes biased into their conductive region. Section 16a of the direct-current supply provides assurance that the signal to be transmitted will not swing the conductive diodes into their high-resistance conditions.

Figure 4:
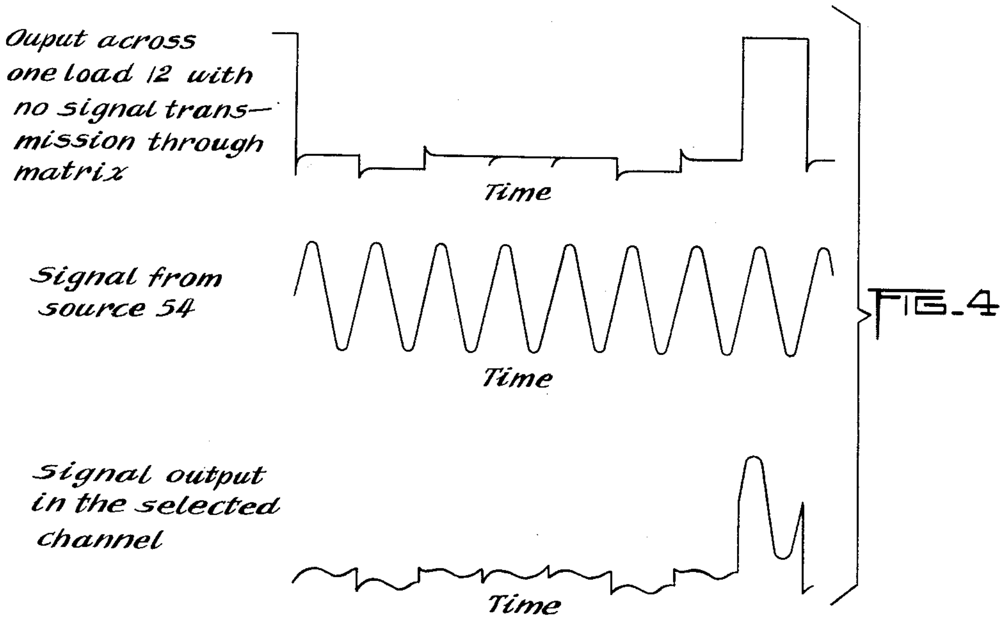
Fig. 4 is a diagrammatic representation of the operation of the system in Fig. 1 in transmitting a signal to a single channel.

Signal source 54 is energized by unit 62 which is comparable to the receiver in a telemetering system wherein a succession of signals is to be transmitted to the matrix and distributed to channels #1 to #8 successively. The received signals are shaped in unit 64 that is also connected to unit 62 into a series of negative pulses that cause successive channel selection under control of units 18 as previously described. The operation is diagrammatically illustrated in Fig. 4, a rough approximation of a sine-wave being illustrated in place of the succession of measurement-representing pulses or comparable signals that might appear in unit 62. The first curve illustrates arbitrarily the effect on a single channel of the succession of pulses, in the absence of any signal voltage applied to impedance 56. That one channel would fail to have cut-off bias developed across its unit 12 for one interval during the sequence established by flip-flop units 18. The second curve shows a succession of signals, arbitrarily a uniformly recurring wave, that is applied to input impedance 56 and through diodes 58a and 58b to the matrix. The third curve C illustrates the transmission of the signal, unchanged, to the selected channel during the time interval that the channel is not blocked. As mentioned previously, power supply section 16a provides the necessary bias for maintaining those diodes conductive that should be conductive during the swing of the signal in the positive and negative directions.

Lead 60 may, of course, be omitted where the channel selection and the signal to be transmitted are not to be interdependent as in the illustrated system. In a computing system, it is readily apparent that a succession of pulses can be impressed on impedance 56 for transmission to any channel #1 to #8 that may be selected arbitrarily or consecutively by suitable electronic switching means.

The foregoing embodiment includes three pairs of control or biasing leads used in combination with a selected one of eight channels, the leads and channels being interconnected by the rectifier matrix. Larger numbers of paired leads and individual channels can be used, as with five pair of leads and thirty-two channels. The single circuit for applying the signal communicates to the selected channel through the matrix itself, which is a vast simplification compared to a matrix having conventional means to apply a signal to all the channels directly. The transmission of the signal through the matrix greatly extends the utility of the matrix, converting it from a purely switching unit to a selective transmission unit.

Figure 5:
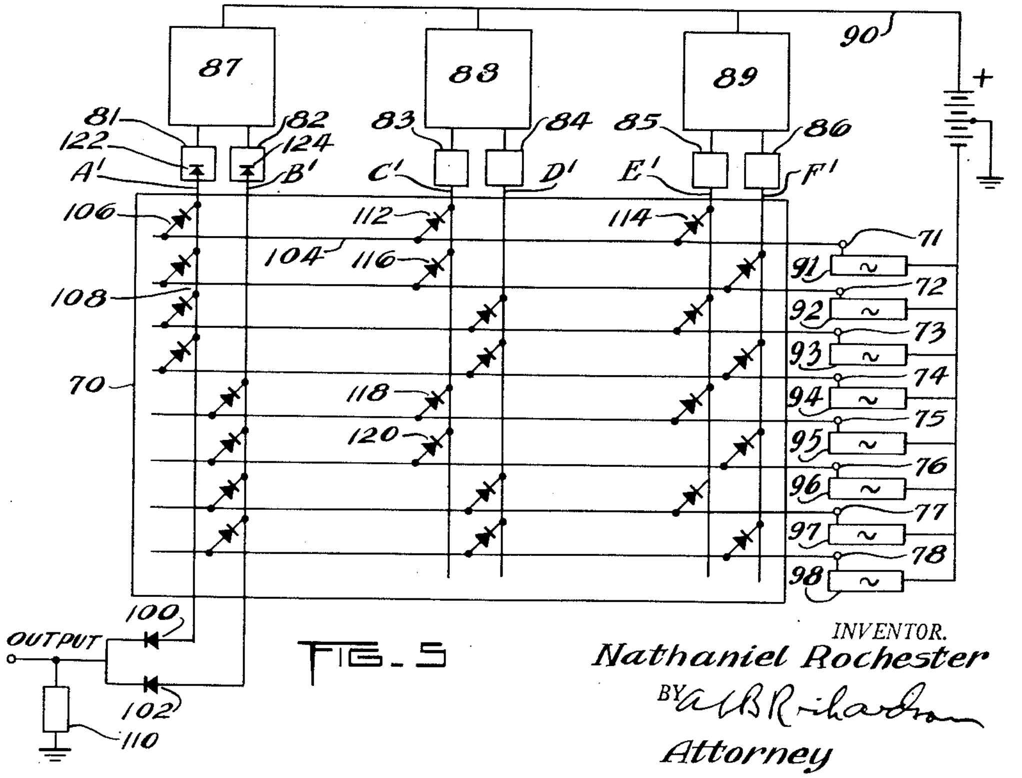
Fig. 5 is a diagrammatic representation of another known form of crystal matrix differing from the matrix in Fig. 1, the matrix in Fig. 5 being adapted in accordance with the invention to function as a collector.

In Fig. 5 there is shown another crystal matrix in which pairs of leads are energized in various combinations for controlling signal transmission through the matrix; but in this figure, the matrix functions as a collector for picking a signal from one channel that is selected by the energized combination of paired leads and transmitting it to a single invariable output lead. The various signal sources may for example be registors in a computing system, and may be regarded as resistors across which signal is impressed through an isolating unit.

In Fig. 5 a crystal matrix 70 is shown which is of the known rectangular form, in contrast to the pyramidal form of Fig. 1, also known. In matrix 70, energization of one lead of each pair of leads A′ and B′, C′ and D′, and E′ or F′ will be effective to disable all but one of the individual channels 71 to 78 inclusive. Thus, by imposing blocking potential on leads B′, D′ and F′ channel 71 will be selected as the only channel left unblocked. Blocking potential is applied to selected leads A′ to F′ inclusive through respective isolating impedances 81 to 86 or the like by means of electronic switches 87, 88 and 89. The control potential for blocking the several channels is applied to units 87, 88 and 89 by means of a common bus 90 for those electronic switches and for signal sources 91 to 98 in channels 71 to 78 respectively.

The network output circuit includes a pair of diodes 100 and 102. These are connected to a pair of control leads A' and B' each of which communicates through the matrix to half the signal sources 91 to 98. When leads B', D' and F' are energized with blocking potential, diode 102 is biased well into the high-resistance portion of its non-linear resistance characteristic. Diode 100 remains in its highly conductive state; and units 87, 88 and 89 can be designed so as to apply positive bias to all diodes not energized with blocking potential. A signal from unit 91 will be transmitted via lead 104, diode 106, lead 108 and diode 100 to the output terminal, and a return circuit to source 91 is provided by impedance 110. There are many other paths for the signal to travel from unit 91 to the output terminal, other than through diode 106. Thus, the signal travels a parallel path through diodes 112 and 114, the current through diode 112 traversing diodes 116, 118 and 120 and, via other diodes, reaching output diode 100 and the output terminal. It should be remembered that the blocking potentials applied to the matrix by leads A' to F' inclusive are of appreciably higher voltage than that of the signal from units 91 to 98.

By conditioning units 87, 88 and 89 arbitrarily in combinations, as under control of a perforated record, the signal from any source 91 to 98 inclusive can be arbitrarily selected. Alternatively units 87, 88 and 89 can take the form of multivibrators cascaded as in Fig. 1; and in that event the signals from units 91 to 98 will be transmitted to the output terminal in fixed sequence, each change being caused by a new pulse input to the first multi-vibrator.

Figs. 1 and 5 warrant comparison in a further respect. It is apparent that the diodes 58*a* and 58*b* between the control leads and the single signal lead are oppositely polarized or backed against the diodes A*a* and B*a*. The diode A*a* or B*a* connected to the positive control lead A or B (and is hence biased to the high-resistance condition) is connected to a diode 58*a* or 58*b* that is biased by supply 16 into its low-resistance state, while the other diode 58*b* or 58*a* blocks the bias potential that is passed by diode B*a* or A*a*. The output diodes 100 and 102 of Fig. 5 are connected directly to the paired control leads; and there is need for effective isolating means, for preventing undue loading of the signal source in the selected channel, among other purposes. Units 81 and 82 will provide such isolation in the event that they take the form of vacuum-tube buffer amplifiers with leads A' and B' connected to the anodes. If cathode-followers are used, however, units 81 and 82 should include supplemental recitifiers 122, 124 reversely polarized in respect to diodes 100 and 102 as is comparable to the arrangement in Fig. 1.

The signal can alternatively be impressed on matrices by other arrangements than those illustrated. For example, in Fig. 1 using an output transformer from source 54 with its secondary winding in series with line 14, or in series with the wire between units 18 and the positive terminal of direct-current supply 16, the signal will pass through matrix via the positive ones among leads A to F and through the impedance of the selected channel.

Various additional modifications, refinements and substitutions in the foregoing illustrative embodiments will occur to those skilled in the art, as well as further uses. Therefore the appended claims should be allowed such broad interpretation as is consistent with the spirit and scope of the invention.

What is claimed is:

1. An electrical signal distributor comprising a selective matrix having any number $n$ of pairs of input leads and up to $2^n$ output channels, said matrix having rectifiers arranged so that energization of one lead of each pair with cut-off polarity will block all but one of said output channels, means to apply cut-off potential to one lead of each of said pairs except one, and signal applying connections to both leads of one of said pairs including isolating means in series with each lead.

2. An electrical signal distributor comprising a selected matrix having any number $n$ of pairs of input leads and up to $2^n$ output channels, said matrix having rectifiers arranged so that energization of one lead of each pair with cut-off polarity will block all but one of said output channels, sequencing means to apply cut-off potential in a repeating series of different patterns to one lead of each of said pairs, signal-applying connections to both leads of one of said pairs including a diode in series with each lead.

3. An electrical signal distributor comprising a passive network having $n$ pairs of input leads and up to $2^n$ output channels wherein one output channel is selected by uniquely patterned energization of one input lead of each of said pairs of leads, each of said leads including isolating means, and signal applying means connected to each lead of one of said pairs of leads for transmitting the signal through the network to one of said output channels.

4. An electrical signal transmission network comprising a passive matrix having any number $n$ of pairs of leads and up to $2^n$ channels wherein blocking of all channels except one corresponds to a unique pattern of blocked leads, means to control the energization pattern of said leads, and a signal transmission path including said matrix, the unblocked one of said channels and a common lead, said common lead being connected to a pair of said leads through rectifiers.

5. An electrical signal distributor comprising a passive matrix having $n$ pairs of input leads and a maximum of $2^n$ output channels, $n$ cascaded flip-flop units having an input terminal, each flip-flop unit having a pair of output connections coupled through isolating means to a respective pair of said leads, signal input connections to a pair of leads including a rectifier in series with each lead of said pair, and a common signal source for said flop-flop input terminal and said signal applying means.

6. A selective transmission system comprising a passive matrix of rectifiers having $n$ pairs of control leads and up to $2^n$ channels, wherein bias applied to the matrix by one lead of each pair via the channels is effective to disable all but a selected one of said channels, and a signal transmission circuit including means to apply less than cut-off bias to said selective channels.

7. A selective transmission system comprising a rectifier matrix having a number of control leads, a larger number of individual channels, means to apply cut-off bias to all channels except the channel selected by a given combination of control leads, and a signal transmission circuit including said matrix having means to apply less than cut-off bias to the selected channel.

8. A translating network for interconnecting a common circuit and any selected one of a large number of channels no higher than $2^n$ under control of $n$ pairs of control leads, said channels, said common circuit and said control leads being interconnected by a rectifier matrix, said common circuit and a pair of said control leads being isolated mutually by series-opposed devices having unidirectional transmission characteristics and having their junction connected to the matrix.

9. A translating network for interconnecting a common circuit and any selected one of a large number of channels no higher than $2^n$ under control of $n$ pairs of control leads, said channels, said common circuit and said control leads being interconnected by a rectifier matrix, said common circuit and a pair of said control leads being isolated mutually by series-opposed diodes having a junction connected to said matrix, means to establish a voltage difference between each pair of control leads, and means to bias the diodes connected to said common circuit to part of said voltage difference.

10. A network for interconnecting a common output circuit and a selected one of plural channels, said network comprising a direct-current supply having one terminal connected to all of said channels and an intermediate tap connected to said common circuit, a matrix interconnecting said common circuit and said channels and having control circuits for selecting the desired one of said channels, said control circuits having return circuits to both terminals of said direct-current supply.

11. A signal transmission network comprising a crystal matrix, paired control leads in said matrix, a cascade of electronic sequencing devices for energizing said paired leads in a fixed sequence of potential combinations, a plurality of channels connected to said matrix and individually selected under control of said paired leads, means to couple a sequence of signals into said matrix for transmission to said channels, and common means to drive said sequencing devices and said signal coupling means.

12. A collector comprising paired control leads, plural signal sources and an output circuit all interconnected by a crystal matrix and biasing means in such manner that only a selected signal source is effective in relation to said output circuit while the remaining sources are blocked by said biasing means, said output circuit being biased to an intermediate potential and being isolated from an extreme potential point by interposed unidirectionally transmitting devices.

13. A selective signal transmission network including a direct-current supply, a rectifier matrix, plural individual channels connected to said matrix, plural control leads connected to said matrix and energizable in various combinations to select one of said channels by distinctive direct-current polarization applied through said matrix, and signal translating means between said direct-current supply and said matrix connected to the selected channel.

NATHANIEL ROCHESTER.

REFERENCES CITED

The following references are of record in the file of this patent:

UNITED STATES PATENTS

| Number | Name | Date |
|---|---|---|
| 2,398,771 | Compton | Apr. 23, 1946 |
| 2,407,320 | Miller | Sept. 10, 1946 |
| 2,476,066 | Rochester | July 12, 1949 |